(12) United States Patent
Angelis et al.

(10) Patent No.: US 10,281,299 B2
(45) Date of Patent: May 7, 2019

(54) ANGLE SENSOR, A BEARING UNIT, ELECTRICAL MOTOR, A CONTROL SYSTEM AND ERROR-CHECK SYSTEM

(71) Applicant: AKTIEBOLAGET SKF, Göteborg (SE)

(72) Inventors: Georgo Angelis, Oss (NL); Evren Yurtseven, Eindhoven (NL)

(73) Assignee: Aktiebolaget SKF, Göteborg (SE)

( * ) Notice: Subject to any disclaimer, the term of this patent is extended or adjusted under 35 U.S.C. 154(b) by 216 days.

(21) Appl. No.: 14/768,788

(22) PCT Filed: Feb. 26, 2013

(86) PCT No.: PCT/EP2013/053828
§ 371 (c)(1),
(2) Date: Aug. 19, 2015

(87) PCT Pub. No.: WO2014/131434
PCT Pub. Date: Sep. 4, 2014

(65) Prior Publication Data
US 2016/0011015 A1    Jan. 14, 2016

(51) Int. Cl.
*G01D 5/245* (2006.01)
*G01D 5/244* (2006.01)
*G01D 5/36* (2006.01)

(52) U.S. Cl.
CPC .......... *G01D 5/2454* (2013.01); *G01D 5/245* (2013.01); *G01D 5/24428* (2013.01); *G01D 5/36* (2013.01)

(58) Field of Classification Search
CPC .. G01D 5/24428; G01D 5/245; G01D 5/2451; G01D 5/2452; G01D 5/2454;
(Continued)

(56) References Cited

U.S. PATENT DOCUMENTS 6,118,271 A * 9/2000 Ely .................. G01D 5/2046
324/207.17
2009/0315544 A1   12/2009 Takahashi et al.
(Continued)

FOREIGN PATENT DOCUMENTS

DE        10132685 A1    1/2003
WO     2010127807 A2   11/2010

*Primary Examiner* — Jeff W Natalini
*Assistant Examiner* — Steven L Yeninas
(74) *Attorney, Agent, or Firm* — Bryan Peckjian; SKF USA Inc. Patent Dept.

(57) ABSTRACT

An angle sensor is provided for determining an absolute angle signal of a first part rotated with respect to a second part. The angle sensor comprises a first grating ring for generating a first signal representative of a relative position of a first sensor along a corresponding ring segment of the first grating ring. The angle sensor further comprises a second grating ring for generating a second signal representative of a relative position of a second sensor along the corresponding ring segment of the second grating ring. The first plurality and the second plurality are co-prime numbers and a difference between the first plurality and the second plurality being larger than 1. The angle sensor also comprises a calculator configured for calculating the absolute angle signal using a first linear combination of the first signal and the second signal.

16 Claims, 6 Drawing Sheets

(58) Field of Classification Search
CPC .. G01D 5/2455; G01D 5/2457; G01D 5/2458; G01D 5/36
USPC .......... 324/207.11–207.25; 702/151
See application file for complete search history.

(56) References Cited

U.S. PATENT DOCUMENTS

2011/0273168 A1 11/2011 Strothmann
2013/0049741 A1* 2/2013 Kichise ................ G01D 5/2046
                 324/207.16

* cited by examiner

PRIOR ART

ANGLE SENSOR, A BEARING UNIT, ELECTRICAL MOTOR, A CONTROL SYSTEM AND ERROR-CHECK SYSTEM

CROSS REFERENCE TO RELATED APPLICATIONS

This is a United States National Stage Application claiming the benefit of International Application Number PCT/EP2013/053828 filed on 26 Feb. 2013 (26 Feb. 2013), which is incorporated herein by reference in its entirety.

FIELD OF THE INVENTION

The present invention relates to an angle sensor for determining an absolute angle signal of a first part rotated with respect to a second part. The invention further relates to a bearing unit, an electrical motor, a control system for the electrical motor and an error-check system comprising the angle sensor. The invention also defines a method of determining the absolute angle signal and a computer program product.

BACKGROUND OF THE INVENTION

Angle sensors, also called rotary encoders or shaft encoders convert an angular position or motion of a shaft or axle to an analog or digital code. Known angle sensors of the mechanical type may use concentric rings with openings. At each angular position, sliding contacts may detect the openings and an electronic circuit may convert the detected pattern of openings into an angular position. Optical encoders may use a similar principle. The concentric rings with openings can be replaced by a disc with transparent and opaque areas. A light source and a photo detector array make it possible to detect the pattern of opaque and transparent areas at a given angle. However, in a bearing environment with grease obscuring the disc, these types of angle sensors are difficult to use.

In bearing applications, angle sensors often comprise a ring having a plurality of magnets and one or more Hall sensors. Often, the magnetic ring is attached to a rotating part of the bearing unit. The Hall sensors, capable of detecting magnetic fields, are typically attached to the static parts of the bearing unit. The magnetic ring comprises a plurality of magnetic poles each of which provides a magnetic field. The Hall sensors detect the magnetic field and an electronic circuit coupled to the Hall sensors converts the detected magnetic field to an angular position within each of the plurality of magnetic poles. This arrangement also works in the greasy bearing environment.

Such angular sensors are, for example, known from a US patent application US2009315544. The angular encoders according to this patent application comprise a rotation detection device which includes a plurality of magnetic encoders of a ring shape arranged coaxially and having different numbers of magnetic poles, a plurality of magnetic sensors each operable to detect the magnetic field of the corresponding magnetic encoder and having a function of detecting positional information within a single magnetic pole of the corresponding magnetic encoder, a phase difference detector for determining the phase difference of magnetic field signals detected respectively by the magnetic sensors, and an angle calculator for calculating an absolute rotation angle of the magnetic encoders based on the detected phase difference.

SUMMARY OF THE INVENTION

It is an object of the invention to provide an alternative angle sensor for determining the absolute angle signal.

A first aspect of the invention provides an angle sensor. A second aspect of the invention provides a bearing. A third aspect of the invention provides an electrical motor. A fourth aspect of the invention provides a control system for controlling the electrical motor. A fifth aspect of the invention provides an error-check system. A sixth aspect of the invention provides a method of determining an absolute angle signal. A seventh aspect of the invention provides a computer program product. Advantageous embodiments are defined in the dependent claims.

According to the first aspect of the invention, the object is achieved by providing an angle sensor for determining an absolute angle signal of a first part rotated with respect to a second part. The angle sensor comprises a first grating ring being constituted of a first plurality of first grating elements being arranged adjacent to each other constituting ring segments, each first grating element interacting with a first sensor for generating a first signal representative of a relative position of the first sensor along the corresponding ring segment of the first grating ring. The angle sensor further comprises a second grating ring being constituted of a second plurality of second grating elements being arranged adjacent to each other constituting ring segments, each second grating element interacting with a second sensor for generating a second signal representative of a relative position of the second sensor along the corresponding ring segment of the second grating ring. The first grating ring and the second grating ring being configured to rotate the same rotation angle as the first part is rotated with respect to the second part. The first plurality and the second plurality are co-prime numbers and a difference between the first plurality and the second plurality is larger than 1. The angle sensor also comprises a calculator configured for calculating the absolute angle signal using a first linear combination of the first signal and the second signal.

The use of the first plurality of first grating elements and the second plurality of second grating elements in which the first plurality and the second plurality are co-prime numbers enables the use of a simple linear relationship for calculating the absolute angle signal, while the difference between the first plurality and the second plurality is larger than 1. In the known angle sensors the difference in number of magnetic poles between the two magnetic encoders is equal to 1. This is convenient as it enables to determine the absolute angle signal simply from a difference signal resulting from subtracting a first signal from the first magnetic encoder from a second signal from the second magnetic encoder. Due to the difference between the number of magnetic poles between the two magnetic encoders in the known configuration the determined difference signal repeats itself only once every 360 degrees of the rotation angle, thus enabling the determination of the absolute angle signal. In the angle sensor according to the invention the first plurality and the second plurality are co-prime numbers. The inventors have found that due to this co-prime relationship between the first plurality and the second plurality, the first plurality of the first grating elements and the second plurality of the second grating elements comply with the Bezout identity enabling a simple linear relationship to calculate the absolute angle signal (see detailed description for further details). As a result, the difference between the first plurality of first grating elements and the second plurality of second grating elements may easily be larger than 1 to still be able to determine the absolute angle signal from the angle sensor. A further benefit, when allowing the difference between the first plurality and the second plurality to be larger than 1, is that this same angle sensor may also be used to calculate, in addition to the absolute angle signal, an electrical angle signal of an electrical motor at relatively high accuracy.

So in an embodiment of the angle sensor according to the invention the angle sensor is further configured for determining both the absolute angle signal and an electrical angle signal of an electrical motor using the first grating ring and the second grating ring. In the angle sensor according to this embodiment, a difference between the first plurality (n1) and the second plurality (n2) being equal to a number of magnetic pole pairs of the electrical motor, and wherein the calculator is configured for calculating the electrical angle signal by calculating the difference between the first signal and the second signal. In the known angle sensors in which the difference in number of magnetic poles between the two magnetic encoders is equal to 1, the determination of both the absolute angle signal and the electrical angle signal using a single pair of magnetic encoders is not accurate enough. To calculate the electrical rotation angle in this known configuration the absolute angle signal has to be multiplied with the number of magnetic pole pairs present in the electrical motor. This multiplication of the absolute angle signal significantly increases the error in the determined electrical angle signal, especially when the number of magnetic pole pairs in the electrical motor is relatively high. As a result, the known angle sensor requires a further magnetic encoder to also determine the electrical rotational angle signal accurately. In the angle sensor according to the present invention, the first plurality and second plurality are co-prime numbers in which the difference between the first plurality and the second plurality is larger than 1. This difference between the first plurality and the second plurality is further also equal to the number of magnetic pole pairs present in the electrical motor. As a result, the electrical angle signal may be calculated by calculating the difference between the first signal and the second signal. Especially in an embodiment in which the number of magnetic pole pairs of the electrical motor is relatively high, the determination according to the current invention results in a significant improvement in the accuracy and in avoiding the requirement of a further magnetic encoder.

The first grating ring and the second grating ring may, for example, be magnetic encoders in which each of the first grating elements and the second grating elements may, for example, be different magnetic poles. Alternatively, the first grating elements or second grating elements may, for example, comprise an electronic resistive element or, for example, triangular shaped openings or any other configuration which is able to generate, together with the corresponding sensor, a signal representative of the relative position of the sensor along the corresponding ring segment of the grating ring. The first sensor and the second sensor interact with the first grating ring and the second grating ring, respectively. In an embodiment in which the first grating element or the second grating element is a magnetic pole, the first sensor or second sensor may, for example, be a Hall sensor or Bragg sensor, for example, comprising a fiber grating. In an embodiment in which the first grating element or the second grating element is a triangular shaped opening, the first sensor or second sensor may, for example, be a light sensor or an array of light sensors. In an embodiment in which the first grating element or the second grating element is the electronic resistive element, the first sensor or second sensor may, for example, be a sliding contact sensing the resistance variation in the electronic resistive element.

In an embodiment of the angle sensor, the first grating ring is a magnetic encoder having the first plurality of grating elements being the first plurality of magnetic poles, and/or the second grating ring is a magnetic encoder having the second plurality of grating elements being the second plurality of magnetic poles. A benefit of using magnetic encoders is that it enables a relatively robust angle sensor which may also be used in, for example, a greasy environment such as with bearings.

In an embodiment of the angle sensor, the first sensor and/or the second sensor is selected from a list comprising: a hall-sensor, a fiber Bragg grating coated with a magnetostrictive material.

In an embodiment of the angle sensor, the first sensor and/or the second sensor is selected from a list comprising: a resistive sensor, an inductive sensor, a reluctive sensor, an eddy-current sensor, a magnetoresistive sensor, a capacitive sensor, and an optical sensor.

In an embodiment of the angle sensor, the calculator further comprising a corrector configured for reducing a noise in the determined electrical angle signal, wherein the corrector is configured for generating a virtual correction signal being a repetitive signal having a repetition frequency fitting a further integer times the electrical angle signal, the virtual correction signal comprising a sum of signal one and signal two, wherein signal one is chosen from a list comprising: the first signal, the second signal, an improved first signal and an improved second signal, and
   wherein signal two is chosen from a list comprising: the absolute angle signal and an improved absolute rotation angle signal.

The virtual correction signal comprises, for example, a sum of the first signal together with the absolute angle signal, or a sum of the second signal together with the absolute angle signal, or a sum of the first signal together with an improved absolute angle signal, or a sum of the second signal together with the improved absolute angle signal, or a sum of an improved first signal together with the absolute angle signal, or a sum of an improved second signal together with the absolute angle signal, or a sum of an improved first signal together with the improved absolute angle signal, or a sum of an improved second signal together with the improved absolute angle signal.

In an embodiment of the angle sensor, the first grating ring and the second grating ring are connected to the first part being a rotating part, while the first sensor and the second sensor are connected to the second part being a static part.

In an embodiment of the angle sensor, the first plurality and the second plurality being co-prime number pairs indicated as (n1, n2)-pairs, wherein the co-prime number pairs are selected from the list of co-prime pairs comprising: (15,29), (15,31), (16,31), (16,33), (17,33), (17,35), (18,35), (18,37), (19,37), (19,39), (20,39), (20,41), (21,41), (21,43), (22,43), (22,45), (23,45), (23,47), (24,47), (24,49), (25,49), (25,51), (26,51), (26,53), (27,53), (27,55), (28,55), (28,57), (29,57), (29,59), (30,59), (30,61), (31,61), (31,63), (32,63), (32,65), (33,65), (33,67), (34,67), (34,69), (35,69), (35,71), (36,71), (36,73), (37,73), (37,75), (38,75), (38,77), (39,77), (39,79), (40,79), (40,81), (41,81), (41,83), (42,83), (42,85), (43,85), (43,87), (44,87), (44,89), (45,89), (45,91), (46,91), (46,93), (47,93), (47,95), (48,95), (48,97), (49,97), (49,99), (50,99), (50,101), (51,101), (51,103), (52,103), (52,105), (53,105), (53,107), (54,107), (54,109), (55,109), (55,111), (56,111), (56,113), (57,113), (57,115), (58,115), (58,117), (59,117), (59,119), (60,119), (60,121), (61,121), (61,123), (62,123), (62,125), (63,125), (63,127), (64,127), (64,129), (65,129), (65,131), (66,131), (66,133), (67,133), (67,135), (68,135), (68,137), (69,137), (69,139), (70,139), (70,141), (71,141), (71,143), (72,143), (72,145), (73,145), (73,147), (74,147), (74,149), (75,149), (75,151), (76,151), (76,153), (77,153), (77,155), (78,155), (78,157), (79,157), (79,159), (80,159), (80,161), (81,161), (81,163), (82,163), (82,165), (83,165), (83,167), (84,167), (84,169), (85,169), (85,171), (86,171), (86,173), (87,173), (87,175), (88,175), (88,177), (89,177), (89,179), (90,179), (90,181), (91,181), (91,183), (92,183), (92,185), (93,185), (93,187), (94,187), (94,189), (95,189), (95,191), (96,191), (96,193), (97,193), (97,195), (98,195), (98,197), (99,197), (99,199), (100,199), (100,201), (101,201), (101,203), (102,203), (102,205), (103,205), (103, 207), (104,207), (104,209), (105,209), (105,211), (106,211), (106,213), (107,213), (107,215), (108,215), (108,217), (109, 217), (109,219), and (110,219).

In an embodiment of the angle sensor, the angle sensor (110) being configured for determining both the absolute angle signal (AA) and an electrical angle signal (EA) of an electrical motor (100) using the first grating ring (345, 445) and the second grating ring (340, 440), the first plurality (n1) and the second plurality (n2) being co-prime number pairs indicated as (n1, n2)-pairs and the difference between the first plurality (n1) and the second plurality (n2) being equal to the number of magnetic pole pairs of the electrical motor (100), wherein:

for the electrical motor (100) comprising 2 motor pole pairs, the co-prime number pairs being selected from the list of co-prime pairs comprising: (15,17), (17,19), (19,21), (21,23), (23,25), (25,27), (27,29), (29,31), (31, 33), (33,35), (35,37), (37,39), (39,41), (41,43), (43,45), for the electrical motor (100) comprising 3 motor pole pairs, the co-prime number pairs being selected from the list of co-prime pairs comprising: (16,19), (17,20), (19,22), (20,23), (22,25), (23,26), (25,28), (26,29), (28, 31), (29,32), (31,34), (32,35), (34,37), (35,38), (37,40), for the electrical motor (100) comprising 4 motor pole pairs, the co-prime number pairs being selected from the list of co-prime pairs comprising: (15,19), (17,21), (19,23), (21,25), (23,27), (25,29), (27,31), (29,33), (31, 35), (33,37), (35,39), (37,41), (39,43), (41,45), (43,47), for the electrical motor (100) comprising 5 motor pole pairs, the co-prime number pairs being selected from the list of co-prime pairs comprising: (16,21), (19,24), (21,26), (24,29), (26,31), (29,34), (31,36), (34,39), (36, 41), (17,22), (18,23), (39,44), (41,46), (44,49), (46,51), for the electrical motor (100) comprising 6 motor pole pairs, the co-prime number pairs being selected from the list of co-prime pairs comprising: (17,23), (19,25), (23,29), (25,31), (29,35), (31,37), (35,41), (37,43), (41, 47), (43,49), (47,53), (49,55), (53,59), (55,61), (59,65), for the electrical motor (100) comprising 7 motor pole pairs, the co-prime number pairs being selected from the list of co-prime pairs comprising: (15,22), (20,27), (22,29), (27,34), (29,36), (34,41), (36,43), (17,24), (18, 25), (41,48), (43,50), (48,55), (50,57), (24,31), (25,32), for the electrical motor (100) comprising 8 motor pole pairs, the co-prime number pairs being selected from the list of co-prime pairs comprising: (15,23), (17,25), (23,31), (25,33), (31,39), (33,41), (39,47), (41,49), (47, 55), (49,57), (55,63), (57,65), (63,71), (65,73), (19,27), for the electrical motor (100) comprising 9 motor pole pairs, the co-prime number pairs being selected from the list of co-prime pairs comprising: (17,26), (19,28), (26,35), (28,37), (35,44), (37,46), (44,53), (46,55), (22, 31), (23,32), (53,62), (55,64), (62,71), (64,73), (31,40), for the electrical motor (100) comprising 10 motor pole pairs, the co-prime number pairs being selected from the list of co-prime pairs comprising: (19,29), (21,31), (29,39), (31,41), (39,49), (41,51), (49,59), (51,61), (59, 69), (61,71), (17,27), (69,79), (71,81), (79,89), (81,91), for the electrical motor (100) comprising 11 motor pole pairs, the co-prime number pairs being selected from the list of co-prime pairs comprising: (21,32), (23,34), (32,43), (34,45), (16,27), (17,28), (43,54), (45,56), (54, 65), (56,67), (15,26), (27,38), (28,39), (65,76), (67,78), for the electrical motor (100) comprising 12 motor pole pairs, the co-prime number pairs being selected from the list of co-prime pairs comprising: (23,35), (25,37), (35,47), (37,49), (47,59), (49,61), (59,71), (61,73), (71, 83), (73,85), (83,95), (85,97), (95,107), (97,109), (107, 119), for the electrical motor (100) comprising 13 motor pole pairs, the co-prime number pairs being selected from the list of co-prime pairs comprising: (25,38), (27,40), (38,51), (40,53), (19,32), (20,33), (51,64), (53,66), (64, 77), (66,79), (17,30), (32,45), (33,46), (77,90), (79,92), for the electrical motor (100) comprising 14 motor pole pairs, the co-prime number pairs being selected from the list of co-prime pairs comprising: (15,29), (27,41), (29,43), (41,55), (43,57), (55,69), (57,71), (69,83), (71, 85), (19,33), (83,97), (85,99), (23,37), (97,111), (99, 113), for the electrical motor (100) comprising 15 motor pole pairs, the co-prime number pairs being selected from the list of co-prime pairs comprising: (16,31), (29,44), (31,46), (44,59), (46,61), (22,37), (23,38), (59,74), (61, 76), (74,89), (76,91), (37,52), (38,53), (89,104), (91, 106), for the electrical motor (100) comprising 16 motor pole pairs, the co-prime number pairs being selected from the list of co-prime pairs comprising: (17,33), (31,47), (33,49), (47,63), (49,65), (63,79), (65,81), (79,95), (81, 97), (21,37), (95,111), (97,113), (27,43), (111,127), (113,129), for the electrical motor (100) comprising 17 motor pole pairs, the co-prime number pairs being selected from the list of co-prime pairs comprising: (18,35), (33,50), (35,52), (50,67), (52,69), (25,42), (26,43), (67,84), (69, 86), (84,101), (86,103), (23,40), (42,59), (43,60), (101, 118), for the electrical motor (100) comprising 18 motor pole pairs, the co-prime number pairs being selected from the list of co-prime pairs comprising: (19,37), (35,53), (37,55), (53,71), (55,73), (71,89), (73,91), (89,107), (91,109), (107,125), (109,127), (125,143), (127,145), (143,161), (145,163), for the electrical motor (100) comprising 19 motor pole pairs, the co-prime number pairs being selected from the list of co-prime pairs comprising: (20,39), (37,56), (39,58), (56,75), (58,77), (28,47), (29,48), (75,94), (77, 96), (94,113), (96,115), (25,44), (47,66), (48,67), (113, 132), for the electrical motor (100) comprising 20 motor pole pairs, the co-prime number pairs being selected from the list of co-prime pairs comprising: (21,41), (39,59), (41,61), (59,79), (61,81), (79,99), (81,101), (99,119), (101,121), (27,47), (119,139), (121,141), (33,53), (139, 159), (141,161), for the electrical motor (100) comprising 21 motor pole pairs, the co-prime number pairs being selected from the list of co-prime pairs comprising: (22,43), (41,62), (43,64), (62,83), (64,85), (31,52), (32,53), (83,104), (85,106), (104,125), (106,127), (52,73), (53,74), (125,146), (127,148), for the electrical motor (100) comprising 22 motor pole pairs, the co-prime number pairs being selected from the list of co-prime pairs comprising: (23,45), (43,65), (45,67), (65,87), (67,89), (87,109), (89,111), (109,131), (111,133), (29,51), (131,153), (133,155), (37,59), (153,175), (155,177), for the electrical motor (100) comprising 23 motor pole pairs, the co-prime number pairs being selected from the list of co-prime pairs comprising: (24,47), (45,68), (47,70), (68,91), (70,93), (34,57), (35,58), (91,114), (93,116), (114,137), (116,139), (31,54), (57,80), (58,81), (137,160), for the electrical motor (100) comprising 24 motor pole pairs, the co-prime number pairs being selected from the list of co-prime pairs comprising: (25,49), (47,71), (49,73), (71,95), (73,97), (95,119), (97,121), (119,143), (121,145), (143,167), (145,169), (167,191), (169,193), (191,215), (193,217). The bearing unit according to the second aspect comprises the angle sensor according to the invention.

The electrical motor according to the third aspect comprises the angle sensor according to the invention.

The control system for the electrical motor according to the fourth aspect comprises the angle sensor according to the invention.

The error-check system according to the fifth aspect comprises the angle sensor according to the invention for determining both the electrical angle signal and the absolute angle signal, wherein the error-check system is configured for determining whether the electrical angle signal is substantially coherent with the absolute angle signal. When this coherence is not observed, the determined electrical angle signal may be erroneous.

In an embodiment of the error-check system, the error-check system further comprises a low-pass filter for eliminating high-frequency noise from the absolute angle signal.

The method according to the sixth aspect uses the angle sensor according to the invention for determining the absolute angle signal. The method comprises the steps of:
  capturing the first signal of the first sensor,
  capturing the second signal of the second sensor,
  determining a set of integer numbers C and D such that $C*n1+D*n2=1$, wherein n1 is the first plurality and n2 is the second plurality, and where n1 and n2 are coprime, and
  determining the absolute angle signal using a first linear combination of the first signal and the second signal using the set of integer number C and D such that $C*A1+D*A2=AA$, wherein A1 is the first signal, A2 is the second signal, and AA is the absolute rotational angle signal.

In an embodiment of the method, the method is further configured for determining both the absolute angle signal and an electrical angle signal using the first grating ring and the second grating ring of the angle sensor, a difference between the first plurality and the second plurality being equal to a number of magnetic pole pairs of the electrical motor, the method further comprising a step of:
  determining the electrical angle signal, by calculating a difference between the first signal and the second signal such that $(A1-A2)=EA$, wherein A1 is the first signal, A2 is the second signal and EA is the electrical rotational angle signal.

The computer program product according to the seventh aspect is configured for performing the method according to the invention.

These and other aspects of the invention are apparent from and will be elucidated with reference to the embodiments described hereinafter.

DETAILED DESCRIPTION OF THE INVENTION

Figure 1:
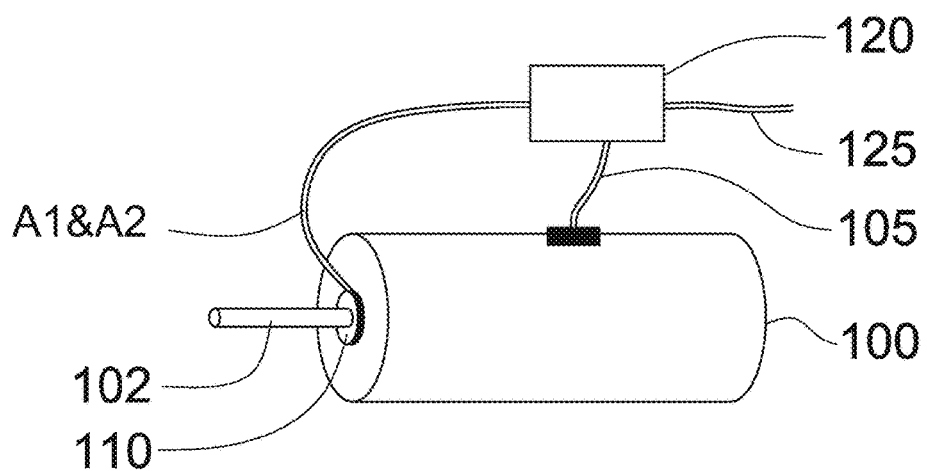
FIG. 1 illustrates a typical control system application of the invention.

FIG. 1 illustrates a typical application of the invention, where an electrical motor 100, for example, a brushless DC motor 100, is driven/controlled by a motor controller 120 with the help of an angle encoder 110. The angle encoder 110 is coupled to the motor axle 102 of the electrical motor 100. When the motor axle 102 turns the angle encoder 110 provides the motor controller 120 with a first signal A1 and a second signal A2 that represent the rotary position of the motor axle 102 and thus the positional relationship between a stator and a rotor of the motor 100. The motor controller 120 can convert the first signal A1 and the second signal A2 into an absolute angle signal AA and/or an electrical angle signal AE, and depending on the absolute angle signal AA and/or electrical angle signal AE convert a supplied power 125 into correct power signals 105 to feed to the motor 100. It is very important for an electronic controller 120 of a brushless DC motor 100 to know the rotational relationship between rotor and stator to enable the motor to be driven as efficiently as possible.

Figure 2:
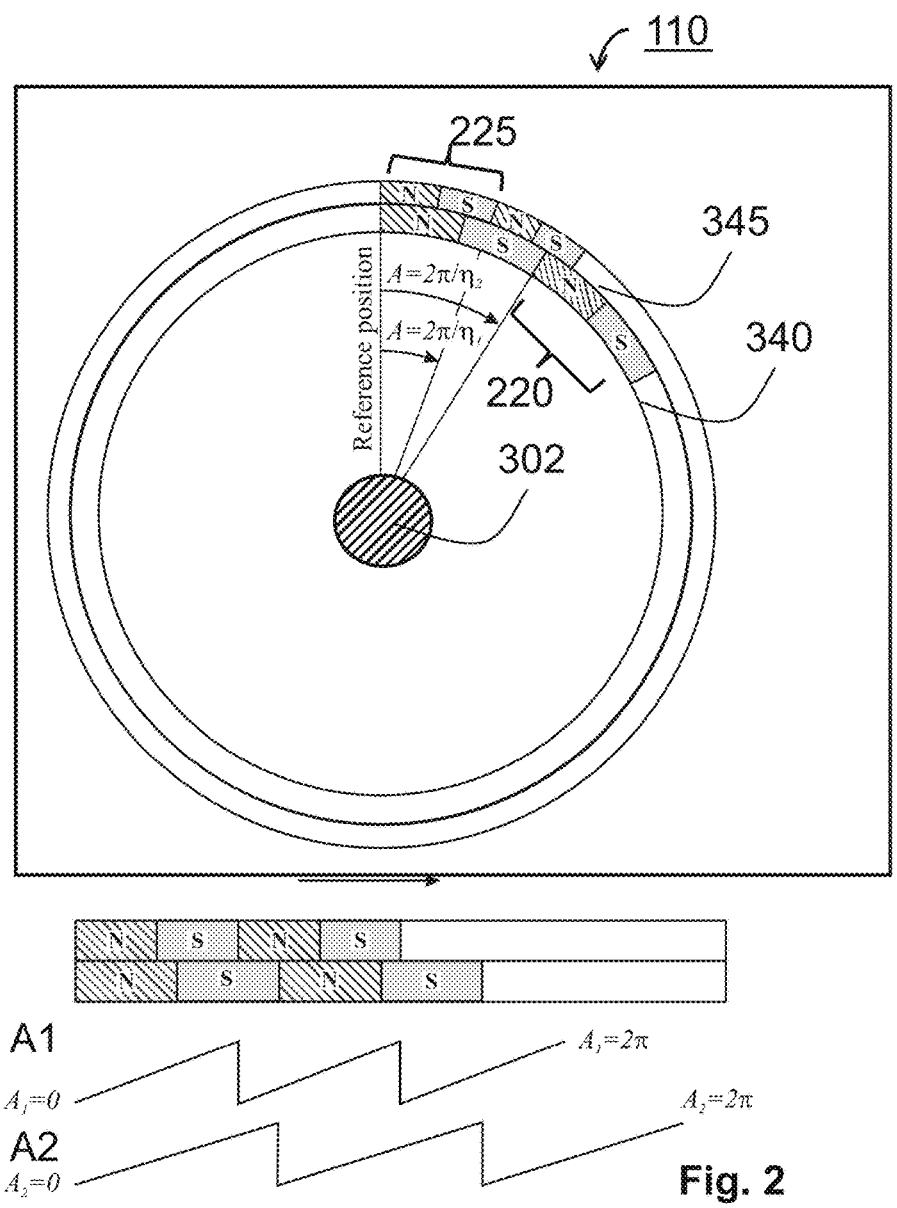
FIG. 2 illustrates a graphical illustration of the angle sensor according to the invention.

FIG. 2 illustrates a graphical illustration of the angle sensor 110 according to the invention having a first grating ring 345 and a second grating ring 340. Each of the first grating ring 345 and the second grating ring 340 comprise a plurality of grating elements 225, 220 in which each of the grating elements 225, 220 is constituted by a magnetic pole pair (each magnetic pole-pair is indicated with N of North-pole and S of South-pole in FIG. 2). The first grating ring 345 comprises a first plurality n1 of grating elements 225, and the second grating ring 340 comprises a second plurality n2 of grating elements 220. The number of grating elements 225, 220 between the first grating ring 345 and the second grating ring 340 are different. When rotating the angle sensor 110 around an axle 302, a first sensor 355 (not shown in FIG. 2 as it is located behind or in front of the grating elements 225—see FIG. 3) will generate a first signal A1, and a second sensor 350 (again not shown in FIG. 2 as it is located behind or in front of the grating elements 220—see FIG. 3) will generate a second signal A2. Because the number of grating elements 225, 220 between the first grating ring 345 and the second grating ring 340 are different rotational angle information can be calculated from these first signal A1 and second signal A2.

Figure 3:
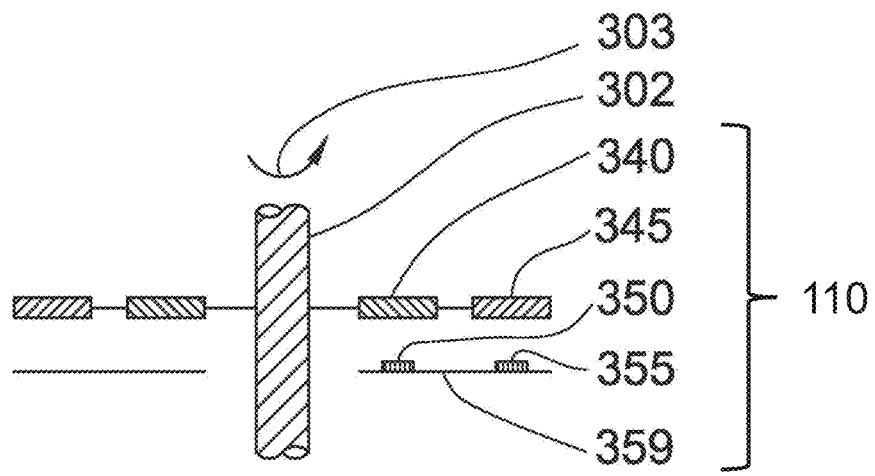
FIG. 3 illustrates a side view of the angle sensor in which the magnet rings are arranged at radially different distances.

FIG. 3 illustrates a side view of an angle sensor 110 setup according to the invention, where encoder magnet rings 340, 345 are arranged at radially different distances and preferably on a same plane. The encoder magnet rings 340, 345 are typically mounted on a same plane about a rotatable 303 axle 302. Each encoder magnet ring 340, 345 will comprise a plurality of magnetic pole-pairs. With a sufficient number of magnetic pole-pairs around an encoder magnet ring 340, 345 a corresponding sensor unit 350, 355 will produce a sine wave output. In the known angle sensors the difference in number of pole-pairs on the inner ring 340 in relation to the outer ring 345 is one, for example n1=6 and n2=5, the phase difference is unambiguous for a full turn, thus creating a full turn absolute position encoder. In the angle sensor according to the invention, the difference between the number of pole-pairs on the inner ring 340 and the outer ring 345 is larger than one. To still ensure that the phase difference is unambiguous for a full turn, the first plurality n1 and the second plurality n2 are co-prime number. This will be further elucidated below.

Figure 4:
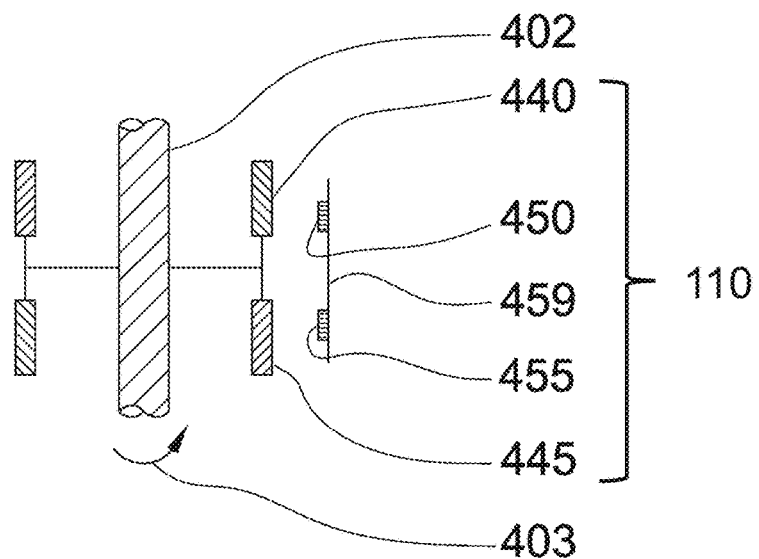
FIG. 4 illustrates a side view of an alternative angle sensor setup according to the invention, in which the encoder magnet rings are arranged along an axle at axially different locations, preferably at the same radial distance from the axle.

FIG. 4 illustrates a side view of an alternative position encoder setup according to the invention, where encoder magnet rings 440, 445 are arranged along an axle at axially different locations, preferably at a same radial distance from a rotating 403 axle 402. This embodiment also comprises corresponding sensor units 450, 455 mounted on a carrier 459.

Figure 5:
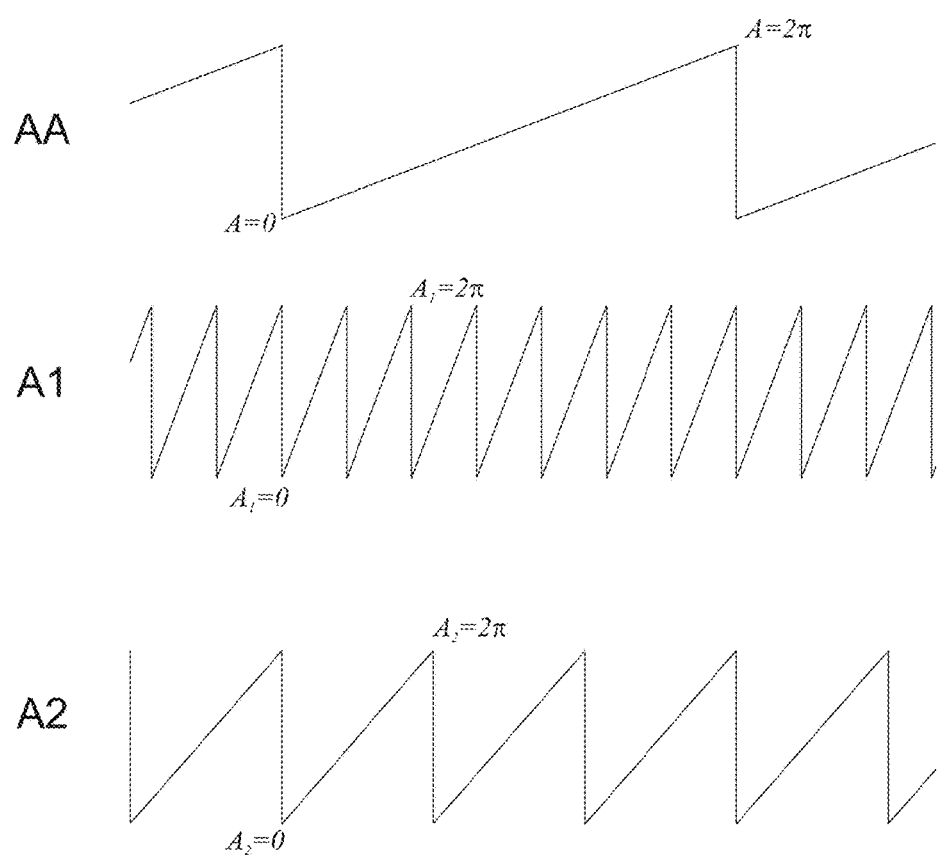
FIG. 5 illustrates an Absolute angle signal together with a first signal from a first grating ring 345 having n1=7 and a second signal from a second grating ring 340 having n2=3.

A first embodiment of this invention is about obtaining the absolute angle signal AA of a rotating shaft. The number of first grating elements n1 and the number of second grating elements n2 denote the number of magnetic pairs on the first grating ring 345 (outer ring) and the second grating ring 340 (inner ring) attached to this shaft 302 or axle 302, respectively. In our computations we will assume that magnetic pairs on each ring are identical. Note that in the example in FIG. 5, for deriving the absolute angle signal AA from the first signal A1 of the first grating elements 225 and the second signal A2 of the second grating elements 220, n1=7, and n2=3.

Throughout the rest of the section, the following convention is used: AA, A1, A2∈[0, 2π). Starting with the following equivalences.

$$A_1 = n_1 AA (\bmod 2\pi)$$

$$A_2 = n_2 AA (\bmod 2\pi)$$

These equivalences may be written as:

$$n_1 AA = 2\pi k + A_1$$

$$n_2 AA = 2\pi l + A_2$$

for some integers k and l. Multiplying the first equality by $n_2/2\pi$ and the second by $n_1/2\pi$ to obtain $$\frac{n_1 n_2}{2\pi} AA = n_2 k + \frac{n_2}{2\pi} A_1$$

$$\frac{n_1 n_2}{2\pi} AA = n_1 l + \frac{n_1}{2\pi} A_2$$

Let us denote $$\frac{n_1 n_2}{2\pi} AA \text{ by } x, \frac{n_2}{2\pi} A_1$$

by $a_1$ and $$\frac{n_1}{2\pi} A_2$$

by $a_2$. Now, we can write these equalities as equivalences as follows.

$$x \equiv a_1 (\bmod n_2) \quad (1)$$

$$x \equiv a_2 (\bmod n_1) \quad (2)$$

If $n_1$ and $n_2$ are chosen to be coprime, then one can find a unique x between 0 and $n_1 n_2$ that solves the above set of congruences by invoking the well-known Chinese remainder theorem. One may immediately recall the definition of x and deduce that a unique x between 0 and $n_1 n_2$ corresponds to a unique A between 0 and $2\pi$.

Thus, it can be concluded that if $n_1$ and $n_2$ are coprime, it is possible to recover the absolute angle signal AA of the shaft 302 by using the angles of the outer 345 and the inner ring 340.

Now it will be shown how to derive the absolute angle AA numerically from $A_1$ and $A_2$. First, we give the solution to the congruences (1) and (2). We claim that x given by $$x = n_1 C a_1 + n_2 D a_2 \quad (3)$$

where C and D are solutions to Bezout's identity, $$n_1 C + n_2 D = 1 \quad (4)$$

satisfies the congruences (1) and (2). To see this, first note that $a_2 - a_1$ is an integer. Multiplying (4) by $a_1$, one gets:

$$n_1 a_1 C = a_1 - n_2 a_1 D$$

Substituting this into (3), we obtain $$x = a_1 + n_2 D(a_2 - a_1)$$

This shows that indeed $x \equiv a_1 (\bmod n_2)$. Using a similar reasoning one can show that x as given in (3) satisfies $x \equiv a_2 (\bmod n_1)$. Now, we need to show that x as given in (3) is the unique solution to (1) and (2) between 0 and $n_1 n_2$. For this purpose suppose that there is another solution x' satisfying (1) and (2). That means x'−x is divisible by both $n_1$ and $n_2$ and hence by $n_1 \times n_2$. That means $x' = x + n_1 n_2 q$ for some integer q. Therefore, x given in (3) is the unique solution to (1) and (2) between 0 and $n_1 n_2$.

Now substituting the definitions of x, $a_1$ and $a_2$ into (3) to arrive at $AA = CA_1 + DA_2$ This formulation shows how to obtain the absolute rotation angle signal AA directly from the angle of the first signal A1 of the first grating ring 345 (outer ring in FIG. 2) and the second signal A2 of the second grating ring 340 (inner ring).

As a side note we would like to remark that AA is known modulo $2\pi$ only. If the sum $CA_1 + DA_2$ is equal to, say $10\pi$, this does not mean the shaft has rotated 5 times. It only means the shaft is at its reference position, i.e. $10\pi \equiv 0 \pmod{2\pi}$.

EXAMPLE

Assume $n_1=143$ and $n_2=119$. The Bezout numbers are then 5 and $-6$. $(143 \times 5 + 119 \times (-6) = 1)$ After measuring the first signal A1 (angle of the outer ring), and the second signal A2 (angle of the inner ring), the absolute angle signal AA of the shaft is simply given as $5A_1 - 6A_2$.

The second embodiment of this invention is about making the absolute angle signal AA more accurate and preserving the accuracy of the electrical angle signal EA. In a design example, $n_1=144$ and $n_2=120$. Electrical angle signal EA, which is required to have a frequency 24 times the mechanical frequency is immediately obtained by subtracting $A_2$ from $A_1$.

$$EA = A_1 - A_2$$

Figure 6A:
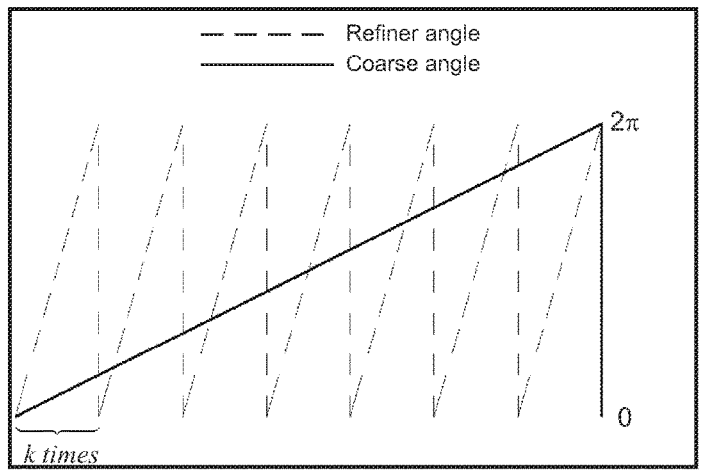
FIGS. 6a, 6b, and 6c illustrate different steps in a known angle refinement technique.

What is noteworthy about this design is that exactly 6 revolutions of $A_1$ fit in each revolution of the electrical angle signal EA (144/24=6). This allows for a refinement procedure which increases the accuracy of EA by a factor of $6\sqrt{2}$. Details of this refinement procedure can be found with respect to FIGS. 6a to 6c. To explain this refinement procedure two angle signals are needed: coarse angle signal and refiner angle signal. We will refine the coarse angle signal using the refiner angle signal. In FIG. 6a, coarse angle is represented by the solid line and the refiner angle signal is represented by the dashed line. It is assumed that an exact integer number of revolutions of the refiner angle signal fit in a single revolution of the coarse angle signal. This integer number is k in FIG. 6a. There is assumed to be a zero-mean noise with standard deviation $\sigma_c$ in the coarse angle signal and a zero-mean noise with standard deviation $\sigma_1$, in the refiner angle signal. Typically, $\sigma_c > \sigma_r$. For ease of exposition, the noise is not shown in the FIGS. 6a to 6c.

Figure 6B:
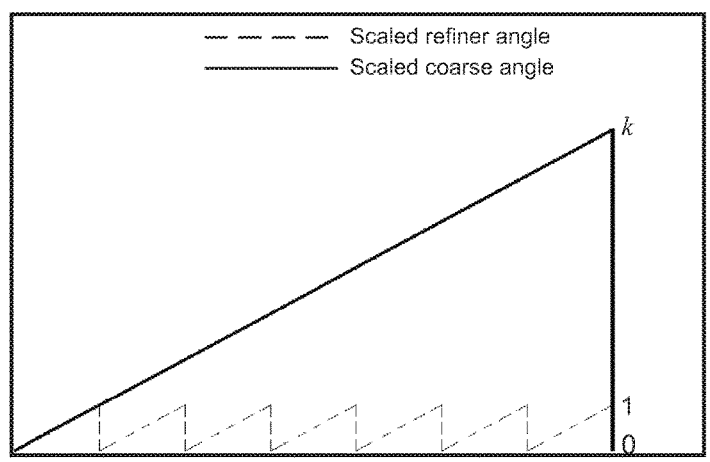

Once the coarse angle signal and refiner angle signal are retrieved, the following calculations can be done to pertaining to the refinement procedure. First, the range of the coarse angle signal is changed from $[0, 2\pi)$ to $[0, k)$ by multiplying it by $k/2\pi$ and subsequently also changing the range of the refiner angle signal from $[0, 2\pi)$ to $[0, 1)$ by dividing it by $2\pi$. The resulting angles are shown in FIG. 6b. Next, the decimal part of each scaled coarse angle signal is truncated, i.e. we rounded towards zero, to get the FIG. 6c.

Finally, the scaled and truncated coarse angle signal and the scaled refiner angle signal are added to obtain the scaled and refined coarse angle, which has a range $[0, k)$. Multiplying it by $2\pi/k$ gives us the refined coarse angle signal in the range $[0, 2\pi)$. Hence, we exchanged a noise of standard deviation $\pi_c$ with a noise of standard deviation $\pi_r/k$.

Figure 6C:
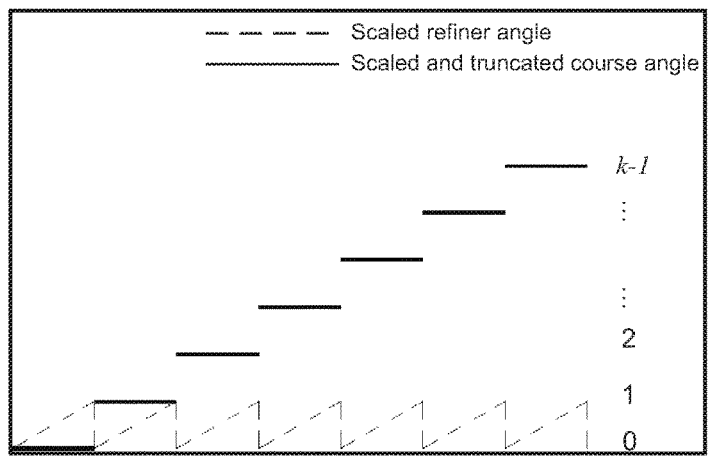

Now we return to a different design where $n_1=143$ and $n_2=119$. The electrical angle signal EA is still given by $A_1 - A_2$. However, there is no longer a whole number of revolutions of either the first signal A1 or the second signal A2 that fit in an electrical revolution of the electrical angle signal EA. Thus, the electrical angle cannot be refined using the know method of refining as shown in FIGS. 6a to 6c. To overcome this issue, the following algorithm is presented. First, the absolute angle signal AA is calculated using $AA = 5A_1 - 6A_2$ and the electrical angle signal by $EA = A_1 - A_2$. Since a whole number (24) of electrical revolutions fit in each mechanical revolution, we refine the absolute angle signal AA using the electrical angle signal EA. Then, we sum the refined absolute angle signal $AA_{refined}$, and the first signal $A_1$ to get an angle that has a frequency 144 times the mechanical frequency.

$$A_1^* = A_1 + AA_{refined}$$

$A_1^*$ is the angle we would get instead of $A_1$ if $n_1$ were 144 instead of 143. Since 6 revolutions of $A_1^*$ fit in each electrical angle, we can refine the electrical angle by using $A_1^*$. Thus, in comparison with the current design, the new design offers the absolute angle signal AA with very little loss in the accuracy of the electrical angle signal EA.

Furthermore, the absolute angle signal AA can be refined a second time by using the refined electrical angle signal $EA_{refined}$. Since the refined electrical angle signal $EA_{refined}$ contains less noise than the electrical angle signal EA, this second refinement will result in a more accurate absolute angle signal. Denoting this refined absolute angle signal by $AA_{refined}^*$, we can calculate $$A_1^{**} = A_1 + AA_{refined}^*$$

$A_1^{**}$ is the same as $A_1^*$ except that it is more accurate. Using $A_1^{**}$ we can refine the electrical angle signal EA a second time and using this doubly refined electrical angle, we can refine the absolute angle a third time and so on. As the number of these refinement iterations increases, the accuracy of the artificial angle (of the frequency 144 times the mechanical frequency) approaches the accuracy of $A_1$. In this process, the accuracies of the electrical angle and the absolute angle approach their limit values.

Figure 7A:
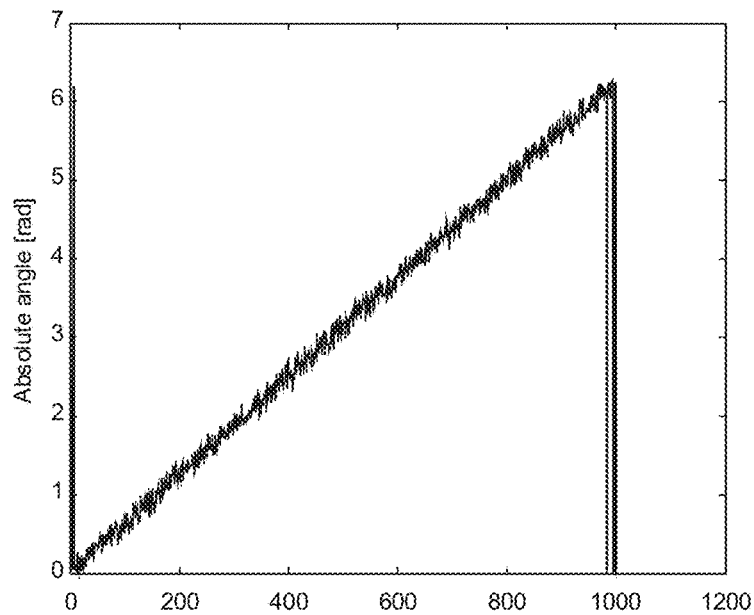
FIGS. 7a and 7b illustrate the absolute angle signal and the electrical angle signal, respectively, containing a significant amount of noise.
Figure 7B:
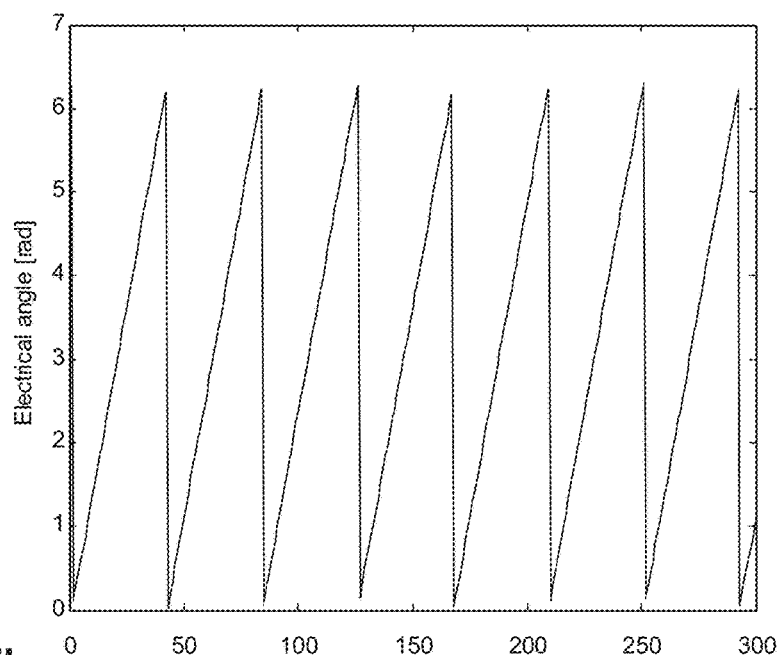

The error-check system according to the invention also used the absolute angle signal AA or the refined absolute angle signal $AA_{refined}$ together with the electrical angle signal EA or the refined electrical angle signal $EA_{refined}$ to perform a error-check procedure. Considering, for example, the absolute angle signal AA shown in FIG. 7a and the electrical angle signal EA in FIG. 7b. One can see that they contain a significant amount of noise. As such, the refinement process may give wrong estimates of these angles. For this purpose, the following check in the algorithm may be used. The refined absolute angle signal is indicated by FAA and the refined electrical angle signal by FEA. We have that $$\begin{bmatrix} FAA \\ FEA \end{bmatrix} = \begin{bmatrix} 5 & -6 \\ 1 & -1 \end{bmatrix} \begin{bmatrix} A_1 \\ A_2 \end{bmatrix}$$

Therefore, FAA and FEA need to be checked whether they satisfy the equation above. Put in another way, $$\begin{bmatrix} A_1 \\ A_2 \end{bmatrix} = \begin{bmatrix} -1 & 6 \\ -1 & 5 \end{bmatrix} \begin{bmatrix} FAA \\ FEA \end{bmatrix}$$

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An angle sensor for determining an absolute angle signal of a first part rotated with respect to a second part, the angle sensor comprising:
    a first grating ring being constituted of a first plurality of first grating elements being arranged adjacent to each other constituting ring segments, each first grating element interacting with a first sensor for generating a first signal representative of a relative position of the first sensor along the corresponding ring segment of the first grating ring;
    a second grating ring being constituted of a second plurality of second grating elements being arranged adjacent to each other constituting ring segments, each second grating element interacting with a second sensor for generating a second signal representative of a relative position of the second sensor along the corresponding ring segment of the second grating ring, the first grating ring and the second grating ring being configured to rotate the same rotation angle as the first part is rotated with respect to the second part, the first plurality and the second plurality being co-prime numbers and a difference between the first plurality and the second plurality being larger than one; and
    a calculator configured for determining the absolute angle signal using a first linear combination of the first signal and the second signal and an electrical angle signal of an electrical motor using the first grating ring and the second grating ring,
    wherein the calculator comprises a corrector configured for reducing a noise in the electrical angle signal by refining the absolute angle signal a first time by using the electrical angle signal to produce a refined absolute angle signal and refining the absolute angle signal a second time using the refined electrical angle signal that contains less noise than the electrical angle signal.

2. The angle sensor according to claim 1, wherein a difference between the first plurality and the second plurality being equal to a number of magnetic pole pairs of the electrical motor,
    wherein the calculator is configured for calculating the electrical angle signal by calculating the difference between the first signal and the second signal.

3. The angle sensor according to claim 2, wherein the corrector is configured for generating a virtual correction signal being a repetitive signal having a repetition frequency fitting a further integer times the electrical angle signal, the virtual correction signal comprising a sum of signal one and signal two,
    wherein signal one is chosen from a list comprising: the first signal, the second signal, an improved first signal and an improved second signal,
    wherein signal two is chosen from a list comprising: the absolute angle signal and an improved absolute rotation angle signal.

4. The angle sensor according to claim 2, the first plurality and the second plurality being co-prime number pairs indicated as pairs and the difference between the first plurality and the second plurality being equal to the number of magnetic pole pairs of the electrical motor, wherein:
    for the electrical motor comprising 2 motor pole pairs, the co-prime number pairs being selected from the list of co-prime pairs comprising: (15,17), (17,19), (19,21), (21,23), (23,25), (25,27), (27,29), (29,31), (31,33), (33,35), (35,37), (37,39), (39,41), (41,43), (43,45),
    for the electrical motor comprising 3 motor pole pairs, the co-prime number pairs being selected from the list of co-prime pairs comprising: (16,19), (17,20), (19,22), (20,23), (22,25), (23,26), (25,28), (26,29), (28,31), (29,32), (31,34), (32,35), (34,37), (35,38), (37,40),
    for the electrical motor comprising 4 motor pole pairs, the co-prime number pairs being selected from the list of co-prime pairs comprising: (15,19), (17,21), (19,23), (21,25), (23,27), (25,29), (27,31), (29,33), (31,35), (33,37), (35,39), (37,41), (39,43), (41,45), (43,47),
    for the electrical motor comprising 5 motor pole pairs, the co-prime number pairs being selected from the list of co-prime pairs comprising: (16,21), (19,24), (21,26), (24,29), (26,31), (29,34), (31,36), (34,39), (36,41), (17,22), (18,23), (39,44), (41,46), (44,49), (46,51),
    for the electrical motor comprising 6 motor pole pairs, the co-prime number pairs being selected from the list of co-prime pairs comprising: (17,23), (19,25), (23,29), (25,31), (29,35), (31,37), (35,41), (37,43), (41,47), (43,49), (47,53), (49,55), (53,59), (55,61), (59,65),
    for the electrical motor comprising 7 motor pole pairs, the co-prime number pairs being selected from the list of co-prime pairs comprising: (15,22), (20,27), (22,29), (27,34), (29,36), (34,41), (36,43), (17,24), (18,25), (41,48), (43,50), (48,55), (50,57), (24,31), (25,32),
    for the electrical motor comprising 8 motor pole pairs, the co-prime number pairs being selected from the list of co-prime pairs comprising: (15,23), (17,25), (23,31), (25,33), (31,39), (33,41), (39,47), (41,49), (47,55), (49,57), (55,63), (57,65), (63,71), (65,73), (19,27),
    for the electrical motor comprising 9 motor pole pairs, the co-prime number pairs being selected from the list of co-prime pairs comprising: (17,26), (19,28), (26,35), (28,37), (35,44), (37,46), (44,53), (46,55), (22,31), (23,32), (53,62), (55,64), (62,71), (64,73), (31,40),
    for the electrical motor comprising 10 motor pole pairs, the co-prime number pairs being selected from the list of co-prime pairs comprising: (19,29), (21,31), (29,39), (31,41), (39,49), (41,51), (49,59), (51,61), (59,69), (61,71), (17,27), (69,79), (71,81), (79,89), (81,91),
    for the electrical motor comprising 11 motor pole pairs, the co-prime number pairs being selected from the list of co-prime pairs comprising: (21,32), (23,34), (32,43), (34,45), (16,27), (17,28), (43,54), (45,56), (54,65), (56,67), (15,26), (27,38), (28,39), (65,76), (67,78),
    for the electrical motor comprising 12 motor pole pairs, the co-prime number pairs being selected from the list of co-prime pairs comprising: (23,35), (25,37), (35,47), (37,49), (47,59), (49,61), (59,71), (61,73), (71,83), (73,85), (83,95), (85,97), (95,107), (97,109), (107,119),
    for the electrical motor comprising 13 motor pole pairs, the co-prime number pairs being selected from the list of co-prime pairs comprising: (25,38), (27,40), (38,51), (40,53), (19,32), (20,33), (51,64), (53,66), (64,77), (66,79), (17,30), (32,45), (33,46), (77,90), (79,92),
    for the electrical motor comprising 14 motor pole pairs, the co-prime number pairs being selected from the list of co-prime pairs comprising: (15,29), (27,41), (29,43), (41,55), (43,57), (55,69), (57,71), (69,83), (71,85), (19,33), (83,97), (85,99), (23,37), (97,111), (99,113),
    for the electrical motor comprising 15 motor pole pairs, the co-prime number pairs being selected from the list of co-prime pairs comprising: (16,31), (29,44), (31,46), (44,59), (46,61), (22,37), (23,38), (59,74), (61,76), (74, 89), (76,91), (37,52), (38,53), (89,104), (91,106), for the electrical motor comprising 16 motor pole pairs, the co-prime number pairs being selected from the list of co-prime pairs comprising: (17,33), (31,47), (33,49), (47,63), (49,65), (63,79), (65,81), (79,95), (81,97), (21, 37), (95,111), (97,113), (27,43), (111,127), (113,129), for the electrical motor comprising 17 motor pole pairs, the co-prime number pairs being selected from the list of co-prime pairs comprising: (18,35), (33,50), (35,52), (50,67), (52,69), (25,42), (26,43), (67,84), (69,86), (84, 101), (86,103), (23,40), (42,59), (43,60), (101,118), for the electrical motor comprising 18 motor pole pairs, the co-prime number pairs being selected from the list of co-prime pairs comprising: (19,37), (35,53), (37,55), (53,71), (55,73), (71,89), (73,91), (89,107), (91,109), (107,125), (109,127), (125,143), (127,145), (143,161), (145,163), for the electrical motor comprising 19 motor pole pairs, the co-prime number pairs being selected from the list of co-prime pairs comprising: (20,39), (37,56), (39,58), (56,75), (58,77), (28,47), (29,48), (75,94), (77,96), (94, 113), (96,115), (25,44), (47,66), (48,67), (113,132), for the electrical motor comprising 20 motor pole pairs, the co-prime number pairs being selected from the list of co-prime pairs comprising: (21,41), (39,59), (41,61), (59,79), (61,81), (79,99), (81,101), (99,119), (101,121), (27,47), (119,139), (121,141), (33,53), (139,159), (141, 161), for the electrical motor comprising 21 motor pole pairs, the co-prime number pairs being selected from the list of co-prime pairs comprising: (22,43), (41,62), (43,64), (62,83), (64,85), (31,52), (32,53), (83,104), (85,106), (104,125), (106,127), (52,73), (53,74), (125,146), (127, 148), for the electrical motor comprising 22 motor pole pairs, the co-prime number pairs being selected from the list of co-prime pairs comprising: (23,45), (43,65), (45,67), (65,87), (67,89), (87,109), (89,111), (109,131), (111, 133), (29,51), (131,153), (133,155), (37,59), (153,175), (155,177), for the electrical motor comprising 23 motor pole pairs, the co-prime number pairs being selected from the list of co-prime pairs comprising: (24,47), (45,68), (47,70), (68,91), (70,93), (34,57), (35,58), (91,114), (93,116), (114,137), (116,139), (31,54), (57,80), (58,81), (137, 160), for the electrical motor comprising 24 motor pole pairs, the co-prime number pairs being selected from the list of co-prime pairs comprising: (25,49), (47,71), (49,73), (71,95), (73,97), (95,119), (97,121), (119,143), (121, 145), (143,167), (145,169), (167,191), (169,193), (191, 215), (193,217).

5. The angle sensor according to claim 1, wherein the first grating ring is a magnetic encoder having the first plurality of grating elements being the first plurality of magnetic poles, and the second grating ring is a magnetic encoder having the second plurality of grating elements being the second plurality of magnetic poles.

6. The angle sensor according to claim 1, wherein at least one of the first sensor and the second sensor is selected from a list comprising: a hall-sensor and a fiber Bragg grating coated with a magnetostrictive material.

7. The angle sensor according to claim 1, wherein at least one of the first sensor and the second sensor is selected from a list comprising: a resistive sensor, an inductive sensor, a reluctive sensor, an eddy-current sensor, a magnetoresistive sensor, a capacitive sensor, and an optical sensor.

8. The angle sensor according to claim 1, wherein the first grating ring and the second grating ring are connected to the first part being a rotating part, while the first sensor and the second sensor being connected to the second part being a static part.

9. The angle sensor according to claim 1, the first plurality and the second plurality being co-prime number pairs indicated as pairs, wherein the co-prime number pairs are selected from the list of co-prime pairs comprising: (15,29), (15,31), (16,31), (16,33), (17,33), (17,35), (18,35), (18,37), (19, 37), (19,39), (20,39), (20,41), (21,41), (21,43), (22,43), (22,45), (23,45), (23,47), (24,47), (24,49), (25,49), (25, 51), (26,51), (26,53), (27,53), (27,55), (28,55), (28,57), (29,57), (29,59), (30,59), (30,61), (31,61), (31,63), (32, 63), (32,65), (33,65), (33,67), (34,67), (34,69), (35,69), (35,71), (36,71), (36,73), (37,73), (37,75), (38,75), (38, 77), (39,77), (39,79), (40,79), (40,81), (41,81), (41,83), (42,83), (42,85), (43,85), (43,87), (44,87), (44,89), (45, 89), (45,91), (46,91), (46,93), (47,93), (47,95), (48,95), (48,97), (49,97), (49,99), (50,99), (50,101), (51,101), (51,103), (52,103), (52,105), (53,105), (53,107), (54, 107), (54,109), (55,109), (55,111), (56,111), (56,113), (57,113), (57,115), (58,115), (58,117), (59,117), (59, 119), (60,119), (60,121), (61,121), (61,123), (62,123), (62,125), (63,125), (63,127), (64,127), (64,129), (65, 129), (65,131), (66,131), (66,133), (67,133), (67,135), (68,135), (68,137), (69,137), (69,139), (70,139), (70, 141), (71,141), (71,143), (72,143), (72,145), (73,145), (73,147), (74,147), (74,149), (75,149), (75,151), (76, 151), (76,153), (77,153), (77,155), (78,155), (78,157), (79,157), (79,159), (80,159), (80,161), (81,161), (81, 163), (82,163), (82,165), (83,165), (83,167), (84,167), (84,169), (85,169), (85,171), (86,171), (86,173), (87, 173), (87,175), (88,175), (88,177), (89,177), (89,179), (90,179), (90,181), (91,181), (91,183), (92,183), (92, 185), (93,185), (93,187), (94,187), (94,189), (95,189), (95,191), (96,191), (96,193), (97,193), (97,195), (98, 195), (98,197), (99,197), (99,199), (100,199), (100, 201), (101,201), (101,203), (102,203), (102,205), (103, 205), (103,207), (104,207), (104,209), (105,209), (105, 211), (106,211), (106,213), (107,213), (107,215), (108, 215), (108,217), (109,217), (109,219), and (110,219).

10. The angle sensor according to claim 1, wherein the angle sensor is integrated into a bearing unit.

11. The angle sensor according to claim 1, wherein the angle sensor is integrated into an electric motor.

12. The angle sensor according to claim 1, wherein the angle sensor is integrated into a control system, wherein the control system is adapted to control the electric motor.

13. An error-check system for checking a determined electrical angle signal of an electrical motor using a determined absolute angle signal, the error-check system comprising an angle sensor, the angle sensor includes:

a first grating ring being constituted of a first plurality of first grating elements being arranged adjacent to each other constituting ring segments, each first grating element interacting with a first sensor for generating a first signal representative of a relative position of the first sensor along the corresponding ring segment of the first grating ring, a second grating ring being constituted of a second plurality of second grating elements being arranged adjacent to each other constituting ring segments, each second grating element interacting with a second sensor for generating a second signal representative of a relative position of the second sensor along the corresponding ring segment of the second grating ring, the first grating ring and the second grating ring being configured to rotate the same rotation angle as the first part is rotated with respect to the second part, the first plurality and the second plurality being co-prime numbers and a difference between the first plurality and the second plurality being larger than 1, and a calculator configured for determining the absolute angle signal using a first linear combination of the first signal and the second signal and an electrical angle signal of an electrical motor using the first grating ring and the second grating ring, wherein the calculator comprises a corrector configured for reducing a noise in the electrical angle signal by refining the absolute angle signal a first time by using the electrical angle signal to produce a refined absolute angle signal and refining the absolute angle signal a second time using the refined electrical angle signal that contains less noise than the electrical angle signal, wherein a difference between the first plurality and the second plurality being equal to a number of magnetic pole pairs of the electrical motor, and wherein the calculator is configured for calculating the electrical angle signal by calculating the difference between the first signal and the second signal, wherein the angle sensor is adapted to determine both the electrical angle signal and the absolute angle signal, the error-check system being configured for determining whether the electrical angle signal is coherent with the absolute angle signal.

14. The error-check system according to claim 13, wherein the calculator further comprises a low-pass filter for eliminating high-frequency noise from the absolute angle signal.

15. A method of determining an absolute angle signal of a first part rotated with respect to a second part using an angle sensor, the angle sensor comprising:

a first grating ring being constituted of a first plurality of first grating elements being arranged adjacent to each other constituting ring segments, each first grating element interacting with a first sensor for generating a first signal representative of a relative position of the first sensor along the corresponding ring segment of the first grating ring, a second grating ring being constituted of a second plurality of second grating elements being arranged adjacent to each other constituting ring segments, each second grating element interacting with a second sensor for generating a second signal representative of a relative position of the second sensor along the corresponding ring segment of the second grating ring, the first grating ring and the second grating ring being configured to rotate the same rotation angle as the first part is rotated with respect to the second part, the first plurality and the second plurality being co-prime numbers and a difference between the first plurality and the second plurality being larger than 1, and a computing device configured for determining the absolute angle signal and an electrical angle signal, the computing device comprising a corrector configured for reducing a noise in the electrical angle signal by refining the absolute angle signal a first time by using the electrical angle signal to produce a refined absolute angle signal and refining the absolute angle signal a second time using the refined electrical angle signal that contains less noise than the electrical angle signal, wherein the computing device performs the method comprises the steps of:

capturing the first signal of the first sensor, capturing the second signal of the second sensor, determining a set of integer numbers C and D such that $C*n1+D*n2=1$, wherein n1 is the first plurality and n2 is the second plurality, and where n1 and n2 are coprime, and determining the absolute angle signal using a linear combination of the first signal and the second signal using the set of integer number C and D such that $C*A1+D*A2=AA$, wherein A1 is the first signal, A2 is the second signal, and AA is the absolute rotational angle signal, and determining the electrical angle signal of an electrical motor using the first grating ring and the second grating ring, wherein the absolute angle signal is twice refined, with a second time using a refined electrical angle signal that contains less noise than the electrical angle signal.

16. The method of claim 15, wherein the method comprises determining a difference between the first plurality and the second plurality being equal to a number of magnetic pole pairs of the electrical motor and determining the electrical angle signal by calculating a difference between the first signal and the second signal such that $(A1-A2)=EA$, wherein A1 is the first signal, A2 is the second signal and EA is the electrical rotational angle.

* * * * *